No. 875,437. PATENTED DEC. 31, 1907.
J. M. KAUFFMANN.
DISTANCE AND ANGLE MEASURER.
APPLICATION FILED JUNE 22, 1907.
3 SHEETS—SHEET 1.
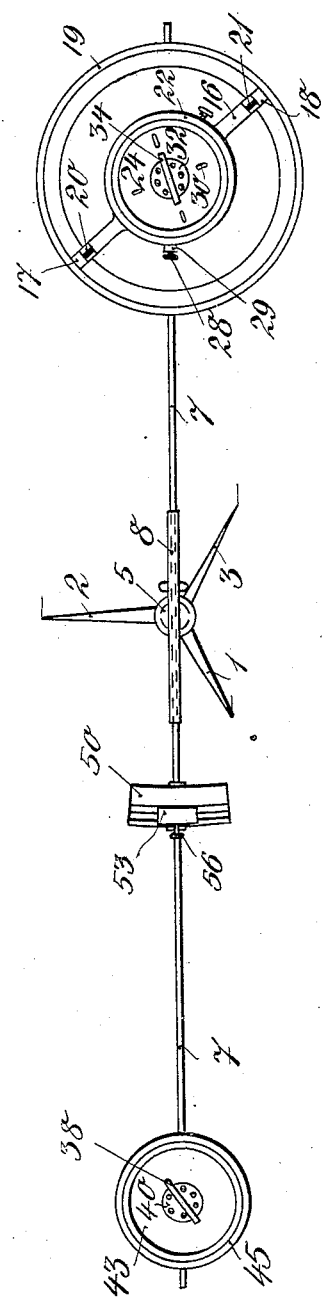
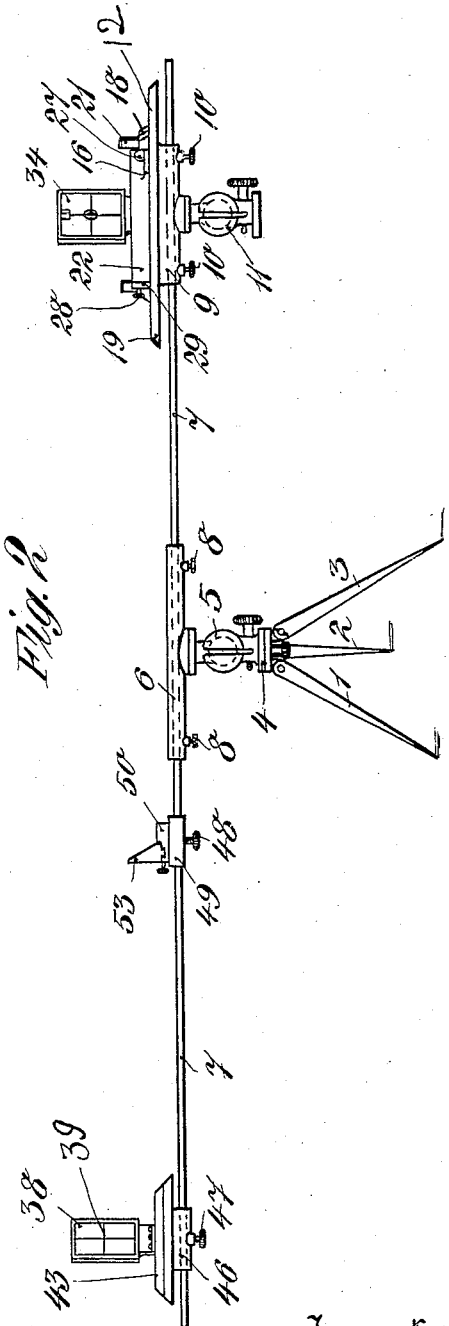
Witnesses
Inventor
Jean M. Kauffmann
by
Attorneys No. 875,437. PATENTED DEC. 31, 1907.
J. M. KAUFFMANN.
DISTANCE AND ANGLE MEASURER.
APPLICATION FILED JUNE 22, 1907.

3 SHEETS—SHEET 2.

Witnesses
Inventor
Jean M. Kauffmann
Attorneys

No. 875,437.　　　　　　　　　　　　　　　PATENTED DEC. 31, 1907.
J. M. KAUFFMANN.
DISTANCE AND ANGLE MEASURER.
APPLICATION FILED JUNE 22, 1907.

3 SHEETS—SHEET 3.

Witnesses　　　　　　　　　Inventor
　　　　　　　　　　　　　　Jean M. Kauffmann
　　　　　　　　　by
　　　　　　　　　　　　　　Attorneys

UNITED STATES PATENT OFFICE.

JEAN MICHAEL KAUFFMANN, OF BETTEMBURG, LUXEMBURG.

DISTANCE AND ANGLE MEASURER.

No. 875,437.      Specification of Letters Patent.      Patented Dec. 31, 1907.

Application filed June 22, 1907. Serial No. 380,297.

*To all whom it may concern:*

Be it known that I, JEAN MICHAEL KAUFFMANN, geometrician, subject of the Grand Duke of Luxemburg, residing at Bettemburg, in the Grand Dukedom of Luxemburg, have invented new and useful Improvements in a Distance and Angle Measurer, of which the following is a specification.

The invention refers to a distance and angle measurer of the kind in which two mirrors are employed the one of which is rigid the other being movable, and the respective distance is measured by the angular position of the movable mirror, on which a part of the silvering has been removed for the purpose of allowing the observer to look straight through.

The purpose of the present invention is to provide a distance and angle measurer of this kind in which the ray of light is reflected only once.

A further object of the invention is to increase the accuracy of the reading of the angle around which the movable mirror is turned. These purposes are obtained by the two mirrors being arranged in line, and one behind the other, with reference to the line of sight from the eye of the observer, the point, the distance or angle of which is to be measured, lying on the side of the sight line. The accuracy of the reading of the angles is increased by means described in the following.

Figure 3:
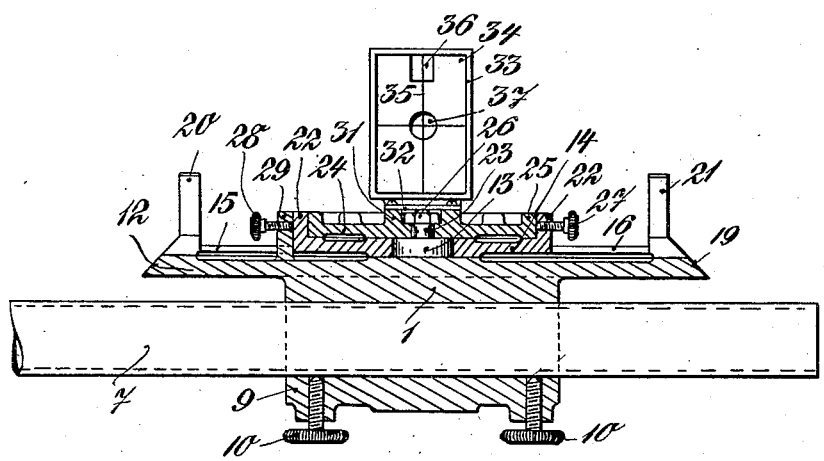
Figure 4:
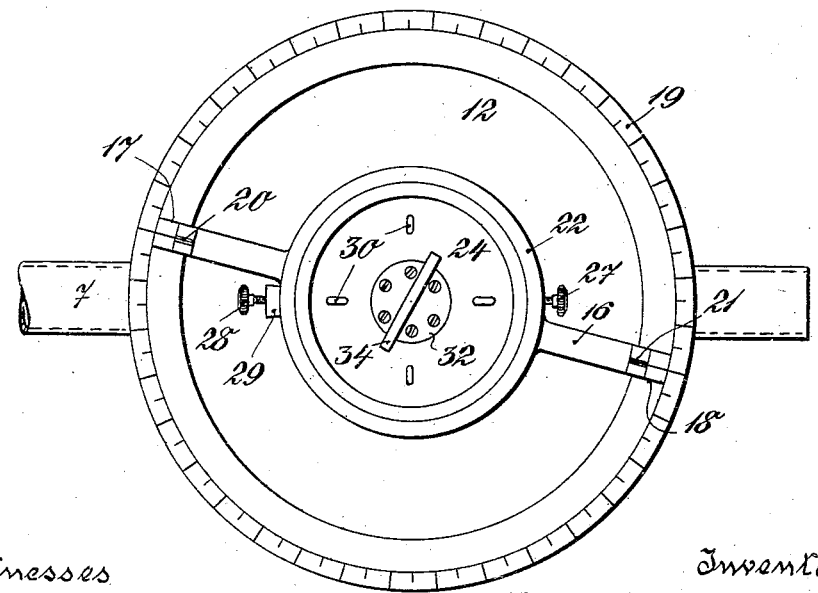
Figure 5:
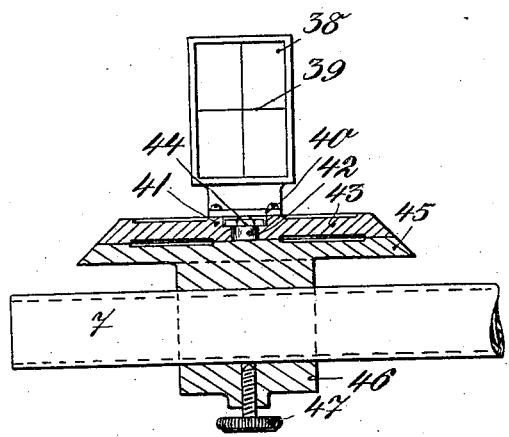
Figure 7:
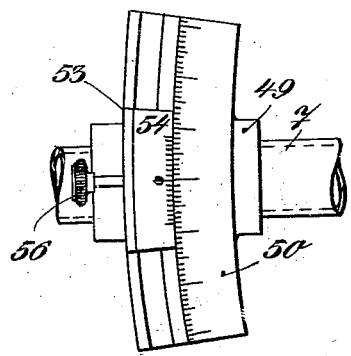
Figure 6:
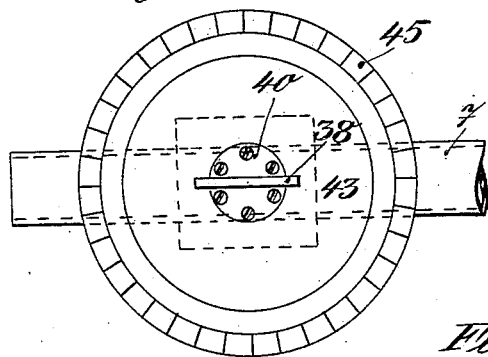
Figure 8:
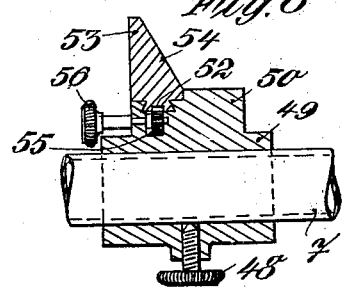
Figure 9:
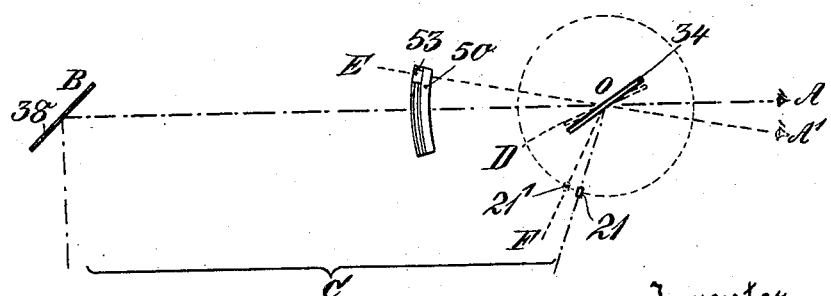

In the accompanying drawing a mode of carrying out the present invention is exemplified, Figure 1 being a plan of the distance and angle measurer; Fig. 2 is a side view: Fig. 3 is a side view with part section through the arrangement for carrying the ocular mirror; Fig. 4 is a plan of this arrangement; Fig. 5 is a side view with part section through the object mirror carrier; Fig. 6 is a plan of the same; Fig. 7 is a plan of an arrangement for reading the angle of the ocular mirror; Fig. 8 is a vertical section through the same; Fig. 9 is a diagram showing the arrangement, and serving to explain its use.

On a base —4—, provided with three feet —1—, —2— and —3—, is adjustably fitted a socket —6—, preferably by means of a ball and socket joint 5, in which socket the tube —7— forming the longitudinal axis of the apparatus is fitted. Tube —7— can be fixed in socket —6— by means of set-screws —8—. On the right hand end of the tube —7— is fitted a socket —9—, which can likewise be fixed by means of two set-screws —10—. The socket —9— has below a ball and socket joint —11— by means of which it can be coupled to the base —4—, if necessary or desirable to substitute socket 9 for the socket 6. On the top side of socket —9— is provided a circular disk —12— with a pivot —13— in its center on which swivels a second disk —14—. This disk —14— is provided with two radial arms —15— and —16— the ends of which are shaped as pointers —17— and —18—, which slide on the outer, somewhat raised rim —19— of the larger disk —12—. The pointers —17—, —18— have a bevel at their extreme edge which corresponds with a similar bevel on the edge —19— of disk —12—. This bevel has a graduation in whole and half degrees. On the pointers —17—, —18—, upright edges —20—, —21— are provided which are suitably sharpened on their top and lie in a line with the zero marks on the pointers. The disk —14— has an outer rim —22— projecting upwards, and encircles with this rim —22— the rim —25— of a third disk —24— swiveling on a set-off —23— of pivot —13—. This disk —24— is held in position by a nut —26— screwed on its pivot, but can freely swivel around the same. In the rim —22— of disk —14— is provided a set-screw —27— which penetrates through the rim and by means of which the disks —14— and —24— can be rigidly coupled together. A similar set-screw —28— is provided in a lug —29— provided on the large disk —12— and serves to rigidly couple the disk —14— to disk —12—.

On the inside disk —24— are provided lugs —30— which serve as gripping means to provide for turning of this disk. In its center this disk —24— has an upwardly projecting ring —31— encircling the nut —26—, on which is screwed a plate —32— which carries on its top a frame —33— serving to receive the mirror —34—. This mirror has a center-cross —35— a recess —36— at the top and a circular hole —37— in the center and can be adjusted around a vertical axis by turning the disk —24— to which it is secured. On the left hand end of tube —7— is provided a similar mirror —38—, also with a center-cross —39— but without the recess or hole of mirror —34—. The mirror —38— is fitted with a plate —40— on the annular projection —41— of a disk —43— swiveling around a pivot —42—. This disk is held by the nut —44— and has a beveled edge, which corresponds with the beveled edge of the stationary disk —45—. The bevel of the stationary disk —45— is graduated, the bevel of the disk —43— has a corresponding pointer not shown. The disk —45— has a socket —46— which is adjustable on tube —7— and can be fixed by means of set-screw —47—.

Between the two mirrors —38— and —34— and at a given distance from the latter is arranged a short arc —50— by means of the socket —49— fixable by set-screw —48—, said arc lying in a plane at right angles to the swiveling axis of mirror —34—, and said axis forming the center of the arc. This arc has a graduation the radius of which has been taken in the present exemplification as $\frac{360 \text{ cm}}{2\pi}$ = about 57 cm, so that one millimeter of the graduation corresponds to an angle of 6 minutes, as the complete circle of the arc has a circumference of $2.r.\pi = \frac{2(360)\pi}{2\pi} = 360$ cm.

The arc —50— has a dovetail undercut groove into which fits a corresponding projection —52— of a sliding part —53— corresponding with the arc and serving as divider for the arc —50—. The projection —52— has a rack on its lower surface into which engages a pinion —55— fitted with a hand wheel —56— and by means of which the sliding part —53— can be moved on the arc —50—. The sliding part —53— has on its top a bevel —54— which corresponds to the graduated surface of the arc —50—. The bevel —54— has a zero-line and a graduation obtained by 17 degrees of the graduation on the arc being divided into 18 degrees and marked off on both sides of the zero line. The dividing circle of the arc —50— is graduated in half millimeters, so that by means of the divider ½ – 17/18 = 1/36 mm can be read. As one millimeter as said above corresponds to an arc of 6 minutes, the above arrangement allows of reading accurately tens of seconds.

The operation of the arrangement will now be explained in a more detailed manner by reference to Fig. 9. In this figure —34— is the ocular, —38— the object mirror, —50— the arc with the divider —53—. —A— is the eye of the observer, —O— the swiveling center of the movable ocular mirror, —B— the center of the object mirror, —C— the object the distance of which is to be ascertained. The point —C— is to be considered as lying in the crossing point of the rays emanating from —B— and —O—. As the size of the paper with the drawing does not suffice to show point —C— in its actual position, a bracket is used, whereby it must be considered that these rays, which in the following are indicated by —BC— and —OC— converge in one point, that is —C—. For measuring the distance of this point the apparatus is fixed with its longitudinal axis OB pointing at right angles to the direction of the point and adjusted until the image of this point —C— is seen in the center cross of the object mirror —38—. Now the ocular mirror —34— is turned until the image reflected by the same over —C O A— appears on the center cross of the mirror and covers the image in the object mirror —38—. This covering is possible as mirror —34— has openings —36— and —37— through which the object mirror —38— can be observed. When the two images cover each other the angle between mirror —34— and the basis line —OB— is, as will be known, equal to exactly half the angle —BOC—, formed by the line connecting the object with —O— and the line —OB—, so that when the former angle is read, the distance of the point —C— can be calculated in known manner by the given size of the angle —OBC— and the length of the basis line —OB—. The angle formed by mirror —38— with the line —OB— is preferably chosen at 45 and fixed so that the angle formed at —B— by the reflected rays of light is 90°, whereby the calculation is simplified. For certain instances however it may be preferable to have at —B— another angle, perhaps an obtuse one. For this purpose the mirror with the disk 43 carrying it can be swiveled around a vertical axis, the degree of the turning being read on the dividing disk —45—.

It is evident that if the angle —BOC— necessary for calculating the distance of point —C— is found by reading the inclination of mirror —34— against line —OB—, an accuracy is obtained under otherwise equal conditions which is only half as great as if said angle could be read directly. In order to avoid this disadvantage, means are provided according to the present invention, which permit a direct reading of the angle formed by the ray —OC—. For this purpose serve the edges —20—, —21— provided on arms —15—, —16— on disk —14—. One of these edges is moved, after the object images have been made to coincide, on the outer edge or rim —19— until its image also covers the object image in mirror —34— or until the edge appears absolutely vertically below the image of point —C— in mirror —34—. Such position corresponds to the position of edge —21— shown in Fig. 9 by full lines. It is obvious that in such instance edge —21— will be exactly in the direction of the sight line —OC— so that the angular deviation of the edge —21— from the line —OB— also directly indicates the angle, which the line —OC— forms with the line —OB—. This angle can then be easily read in degrees and half degrees on the graduation of disk —12—.

In order to obtain a still greater accuracy of reading, the above described arrangement with arc —50— is employed, which will be explained with reference to the diagram Fig. 9. When the edge —21— has been adjusted in the above described manner the whole and half degrees can be read directly on the graduation of disk —12—. For also reading the fractions in minutes and seconds, by which the pointer connected to edge —21— deviates from the degrees and half degrees read, the disk 14 carrying arm —16— with the respective pointer is turned back after having been previously rigidly coupled by means of set-screw —27— to disk —24— carrying mirror —34— until the pointer covers exactly a full graduation on the edge or rim —19—. This position then corresponds to the position of edge —21'— shown in Fig. 9 by dotted lines. If now the divider —53— is observed over the image of the edge —21— in the center cross of mirror —34— and the divider is adjusted so that its zero line covers exactly with the image of edge —21— in mirror —34— the angle —EOB— formed by sight line —A'E— with line —OB— will, as may be seen from Fig. 9 be equal to angle —COF— around which the pointer has been turned back. This angle can be read from ten to ten seconds by means of the divider on the graduation of arc —50— as described above and must be added to the full and half degrees read on graduation —19—, so as to obtain the desired angle —BOC— up to tens of seconds.

As the mirrors —34—, —38— can be adjusted by means of socket —9— and —46— on the tube —7—, the distance of the mirror centers from each other can be optionally adjusted for varying the basis line —OB— on which the calculation is based. Besides the mirrors may be thus turned around a mutual horizontal axis, that of tube —7— if distance or angles are to be measured which are not in a horizontal level but inclined thereto as may be the case in mountainous districts. A particular advantage of the present invention lies in the fact that by its use the sight-ray is only once reflected, so that the instrument may be conveniently used even in twilight or dusky weather.

Having now described my invention what I claim and desire to secure by Letters Patent of the United States is:

1. In a distance and angle measurer, the combination of a base, two mirrors attached to said base, one of said mirrors being fixed and the other rotatable relative to said base, the rotatable mirror being provided with means to permit observation therethrough, the reflecting surfaces of both mirrors looking to the same side with respect to the connecting line of the centers of said mirrors, and means for reading the angle of rotation of said rotatable mirror.

2. In a distance and angle measurer, the combination of a stand, a horizontal tube attached to said stand, two mirrors attached to said tube, one of said mirrors being fixed and the other rotatable, the rotatable mirror having means to permit observation therethrough, the reflecting surfaces of both mirrors looking to the same end of the tube, and means for reading the angle of rotation of said rotatable mirror.

3. In a distance and angle measurer a base two mirrors attached to said base, one of said mirrors being rotatably arranged, the rotatable mirror having only a portion thereof silvered, the reflecting surfaces of both mirrors looking to the same side, an index capable of being turned independently of the rotation of the rotatable mirror about the axis of said mirror a graduation for reading the angle of rotation of the rotatable mirror, said index being adjustable on said graduation and having a mark adapted to be seen in the rotatable mirror, as described.

4. In a distance and angle measurer a base, two mirrors attached to said base one of said mirrors being rotatably arranged, the rotatable mirror having only a portion thereof silvered, the reflecting surfaces of both mirrors looking to the same side an index capable of being turned independently of the rotation of said rotatable mirror about the axis of said mirror, a graduated arc concentric to the axis of the rotatable mirror, the diameter of said arc being greater than that of the circle of graduation for said rotatable mirror, said arc being provided with a divider slidable along said arc and adapted to be viewed through the uncovered part of said rotatable mirror, as described.

5. In a distance and angle measurer a base, two mirrors attached to said base one of said mirrors being rotatably arranged, the rotatable mirror having only a portion thereof silvered, the reflecting surfaces of both mirrors looking to the same side, both mirrors being provided with center crosses, a disk capable of being turned about the axis of the rotatable mirror independently of the rotation of said mirror, indices attached to said disk, upwardly projecting marks on said indices, a graduated disk concentric to said index disk, means for rigidly connecting said index disk with said rotatable mirror and said graduated disk, as described.

6. In a distance and angle measurer a stand, a horizontal tube attached to said stand, two sockets adjustable on said tube and provided on their upper side with graduated disks, each of said disks carrying a mirror being rotatable on pivots of said disks, said pivots being vertically arranged an axis to said tube, both mirrors having their reflecting surfaces looking to the same side and being provided with center crosses, one of said mirrors having an index, sliding on the corresponding graduated disk, the second mirror having a circular hole in the center and a recess at the top and being secured to a circular rotatable disk concentric to said pivot and being rigidly fixable by means of a set screw to another concentric disk provided with indices slidable on the corresponding graduated disk, said index disk having marks projecting beyond the lower edge of said second mirror and being fixable to said graduated disk by means of a set screw, a graduated arc attached to said tube between said mirrors, said graduated arc being concentric to the axis of the second mirror and of larger diameter than said graduated disk and lying in the plane of rotation of said second mirror, said arc being also provided with a veneer slidable on it, as described.

In testimony whereof I have hereunto set my hand in presence of two subscribing witnesses.

JEAN MICHAEL KAUFFMANN.

Witnesses:
J. MENNEBURG,
XOURE BROSEUR.